No. 716,492. Patented Dec. 23, 1902.
L. STERNE.
ENGINE OR MOTOR.
(Application filed Apr. 11, 1902.)
(No Model.)
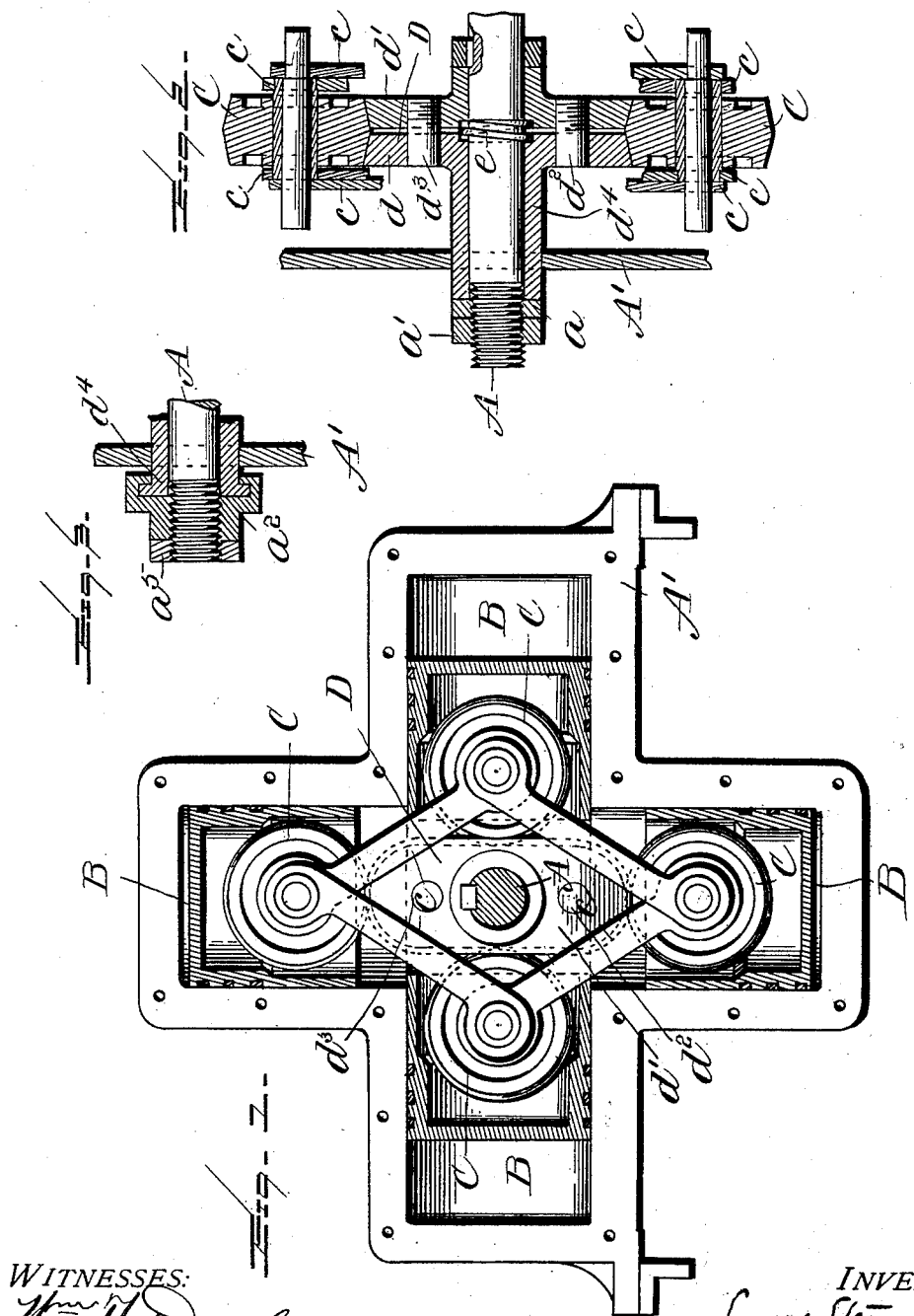
WITNESSES:
INVENTOR
BY
Attorneys

UNITED STATES PATENT OFFICE.

LOUIS STERNE, OF LONDON, ENGLAND.

ENGINE OR MOTOR.

SPECIFICATION forming part of Letters Patent No. 716,492, dated December 23, 1902.

Application filed April 11, 1902. Serial No. 102,446. (No model.)

*To all whom it may concern:*

Be it known that I, LOUIS STERNE, a citizen of the United States, residing at London, England, have invented certain new and useful Improvements in Engines or Motors; and I do hereby declare the following to be a full, clear, and exact description of the invention, such as will enable others skilled in the art to which it appertains to make and use the same.

My present invention relates to the class of engines or motors; and it consists more particularly of an improvement upon the construction of engine shown, described, and claimed in the patent granted to W. H. Barker April 1, 1902, and numbered 696,663. In the said patent is shown and described an engine having a plurality of cylinders, the pistons of which are trunk-pistons and carry each a roller which bears upon a cam and acts to give motion by the thrust of the pistons against the cam. In the engine shown in the said patent to W. H. Barker the pistons are connected to each other by a duplicate series of links, one series on each side of the cam, engaged by the rollers of the pistons.

My improvement consists in a construction of operative cam and of its combination with the piston-rollers, whereby the putting of said rollers and cam into working relation in assembling the parts of the engine is facilitated, the one guided in respect to the other, and provision is made to take up lost motion resulting from wear.

Figure 1 shows an engine with my improvements attached, partly in section. Fig. 2 is a longitudinal section of the operative cam with two piston-rollers in line with the cam. Fig. 3 shows a modified form of the adjusting means.

In said drawings the main parts are placed in the same relation to operate in the same way as in the engine in the said Barker patent.

A is the shaft; B, the cylinders of the engine, which in this instance are four in number.

C represents the rollers carried by the pistons and bearing upon the cam D, and $c\ c\ c\ c$ are the links forming the series of links on one side of the cam, it being understood that there is a corresponding series on the other side of the cam. The cam is in this instance made with a shallow peripheral groove, and each of the rollers has its periphery given a configuration to fit the groove in the periphery of the cam. The preferred form of the groove of the cam is a shallow V form, as shown; but the walls of the groove may be curved instead of straight. The cam D is further made in two parts $d\ d'$. Each of the parts is recessed to receive a spring $e$, and one part is provided with dowels $d^2\ d^3$, which engage openings in the other part of the cam and hold the two together for joint rotary movement, while permitting one part to be moved along the shaft toward or from the other. One of the parts of the cam is keyed or otherwise secured to the shaft, while the other has a sleeve portion $d^4$ extending beyond the casing A'. The shaft at the end of the sleeve is provided with a nut $a$, which can be turned to force the part $d$ of the cam toward the other part, closing the piston-rollers outward. When the opposite effect is desired, the nut $a$ is turned in the opposite direction, and the spring $e$ forces the part $d$ away from the part $d'$ of the cam. This construction permits of the adjustment of the cam from the outside of the casing and can be made at any time without removing the casing or in any other way disturbing the other parts of the engine. I usually employ a jam-nut $a'$ to prevent the accidental displacement of the movable part of the cam.

In Fig. 3 I have shown a modified construction, in which I dispense with the spring $e$ and move the part $d$ of the cam in both directions by the nut $a^2$, which engages a flange upon the sleeve $d^4$. A jam-nut $a^5$ may also be used to prevent accidental displacement.

If preferred, both parts of the cam can be moved instead of moving one only; but the form shown is the one I prefer, and in this construction the rollers C are given a little lateral movement on their bearings to permit them to follow the adjustment of the cam.

What I claim, and desire to secure by Letters Patent, is—

1. In an engine of the type described, the combination with the pistons of rollers and operative cam united by a guiding construction for holding the two devices in the same vertical plane, substantially as described.

2. In an engine of the type described, the combination with the pistons, of rollers and operative cam united by a guiding construction for holding the two devices in the same vertical plane, one of said parts being adjustable to take up wear, substantially as described.

3. In an engine of the type described, the combination with the pistons of rollers having angular faces, of the angularly-grooved cam made in two parts, the one adjustable toward the other to take up wear, substantially as described.

4. In an engine of the type described, the combination with the piston-rollers having a portion of their periphery projecting centrally around the same, of a correspondingly-grooved cam made in two parts, one of said parts having a sleeve extending beyond the engine-casing and adjusting means engaging the said sleeve outside of said casing, substantially as described.

5. In an engine of the type described, the combination with the angularly-faced rollers, of the grooved cam formed in two parts, the dowels connecting said parts, the spring for holding the two parts of the cam apart and means for forcing the parts together, substantially as described.

In testimony whereof I affix my signature in the presence of two witnesses.

LOUIS STERNE.

Witnesses:
W. H. BARKER,
R. F. GREACEN.